United States Patent
Chou et al.

(10) Patent No.: US 8,108,091 B2
(45) Date of Patent: *Jan. 31, 2012

(54) AUTOMATIC POSITION-BASED GUIDE TOY VEHICLE APPARATUS

(75) Inventors: Li-Der Chou, Jung-li (TW); De-Ming Chan, Jung-li (TW)

(73) Assignee: National Central University, Taoyuan County (TW)

( * ) Notice: Subject to any disclaimer, the term of this patent is extended or adjusted under 35 U.S.C. 154(b) by 915 days.

This patent is subject to a terminal disclaimer.

(21) Appl. No.: 12/124,580

(22) Filed: May 21, 2008

(65) Prior Publication Data

US 2009/0138150 A1  May 28, 2009

(30) Foreign Application Priority Data

Nov. 22, 2007  (TW) .................................. 96144233

(51) Int. Cl.
G01C 22/00 (2006.01)

(52) U.S. Cl. ........................................................ 701/23

(58) Field of Classification Search .................. 701/23, 701/25, 28; 446/409
See application file for complete search history.

(56) References Cited

U.S. PATENT DOCUMENTS

| | | | | |
|---|---|---|---|---|
| 6,246,933 B1* | 6/2001 | Bague | ............................. | 701/35 |
| 6,374,155 B1* | 4/2002 | Wallach et al. | ............... | 700/245 |
| 6,438,472 B1* | 8/2002 | Tano et al. | ........................ | 701/35 |
| 6,470,235 B2* | 10/2002 | Kasuga et al. | ................. | 700/246 |
| 7,542,835 B2* | 6/2009 | Takahama et al. | ............... | 701/45 |
| 7,561,054 B2* | 7/2009 | Raz et al. | ........................ | 340/576 |
| 7,619,668 B2* | 11/2009 | Saka et al. | ...................... | 348/251 |
| 7,671,725 B2* | 3/2010 | Tsuji et al. | ...................... | 340/435 |
| 7,676,306 B2* | 3/2010 | Kubo et al. | ...................... | 701/35 |
| 7,788,027 B2* | 8/2010 | Jones | ............................. | 701/207 |
| 7,843,431 B2* | 11/2010 | Robbins et al. | ............... | 345/161 |
| 7,899,211 B2* | 3/2011 | Fujimoto | ...................... | 382/104 |
| 2006/0276964 A1* | 12/2006 | Sano | ............................. | 701/300 |
| 2007/0093945 A1* | 4/2007 | Grzywna et al. | ................ | 701/23 |
| 2009/0281725 A1* | 11/2009 | Sakata | .......................... | 701/208 |

FOREIGN PATENT DOCUMENTS

JP  2007047875 A  *  2/2007

* cited by examiner

*Primary Examiner* — Faye M. Fleming

(74) *Attorney, Agent, or Firm* — Jackson IPG PLLC; Demian K. Jackson

(57) ABSTRACT

An apparatus uses a guide toy vehicle and has a smart floor environment. The smart floor environment is filled with location tags. Data can be found in a back-end database for location tags of an exhibit unit through a wireless network. The data comprise multimedia information to improve learning. Thus, with the present invention students can have better learning for achieving a default teaching goal.

20 Claims, 11 Drawing Sheets

AUTOMATIC POSITION-BASED GUIDE TOY VEHICLE APPARATUS

FIELD OF THE INVENTION

The present invention relates to a guide toy vehicle apparatus; more particularly, relates to providing a smart floor environment to guide a guide toy vehicle for positioning correctly through a wireless network and providing a better learning with materials stored at a back-end platform.

DESCRIPTION OF THE RELATED ART

Traditional learning methods change much following developments of the Internet. Learning is no longer limited in classroom, not even in time and space. Different ideas and operations have sprung out through using network technologies. On comparing to the traditional learning methods, a new model is set by the learning methods through using network technologies. The learning activities focus more on learning but teaching.

General guidance systems are basically only designed for qualified visitors. Yet, age limits on visitors may trouble people most; and, thus, not all visitors can learn related knowledge by visiting desired exhibits. Besides, related guidance materials are mostly standardized and not revisable for enrichment. In addition, different guidance materials in different guidance systems generally can not be shared in between, which forms a learning obstacle on obtaining new knowledge for learners. As a result, without effective guidance and help learners may obtain different learning effects biased from the target effects originally designed. Hence, the prior arts do not fulfill all users' requests on actual use.

SUMMARY OF THE INVENTION

The main purpose of the present invention is to provide a smart floor environment to guide a guide toy vehicle for positioning correctly and provide a simple management system with a database.

The second purpose of the present invention is to provide guidance information through a wireless network for an effective learning with vivid multimedia contents.

The third purpose of the present invention is to provide the multimedia contents along with achievement tests to achieve default learning targets.

The fourth purpose of the present invention is to obtain services during the guidance by integrating various guidance services into a single platform.

To achieve the above purposes the present invention is an automatic position-based guide toy vehicle apparatus, comprising a scene model, a vehicle model, a guidance system model, a service model and an application model, where the scene model comprises a sensing pad, a scene map and a plurality of exhibit units; the vehicle model comprises a guide toy car, a wireless reader and a wireless network; the guidance system model comprises a display u nit and a wireless network; the service model comprises a system service and a mobile vehicle control service; and the application model comprises a teaching function, a learning function and an add-on function. Accordingly, a novel automatic position-based guide toy vehicle apparatus is obtained.

BRIEF DESCRIPTION OF THE DRAWINGS

The present invention will be better understood from the following detailed descriptions of the preferred embodiments according to the present invention, taken in con unction with the accompanying drawings, in which

FIG. 10 is the view showing the two vectors with the angle in between; and

DESCRIPTIONS OF THE PREFERRED EMBODIMENTS

The following descriptions of the preferred embodiments are provided to understand the features and the structures of the present invention.

Figure 1:
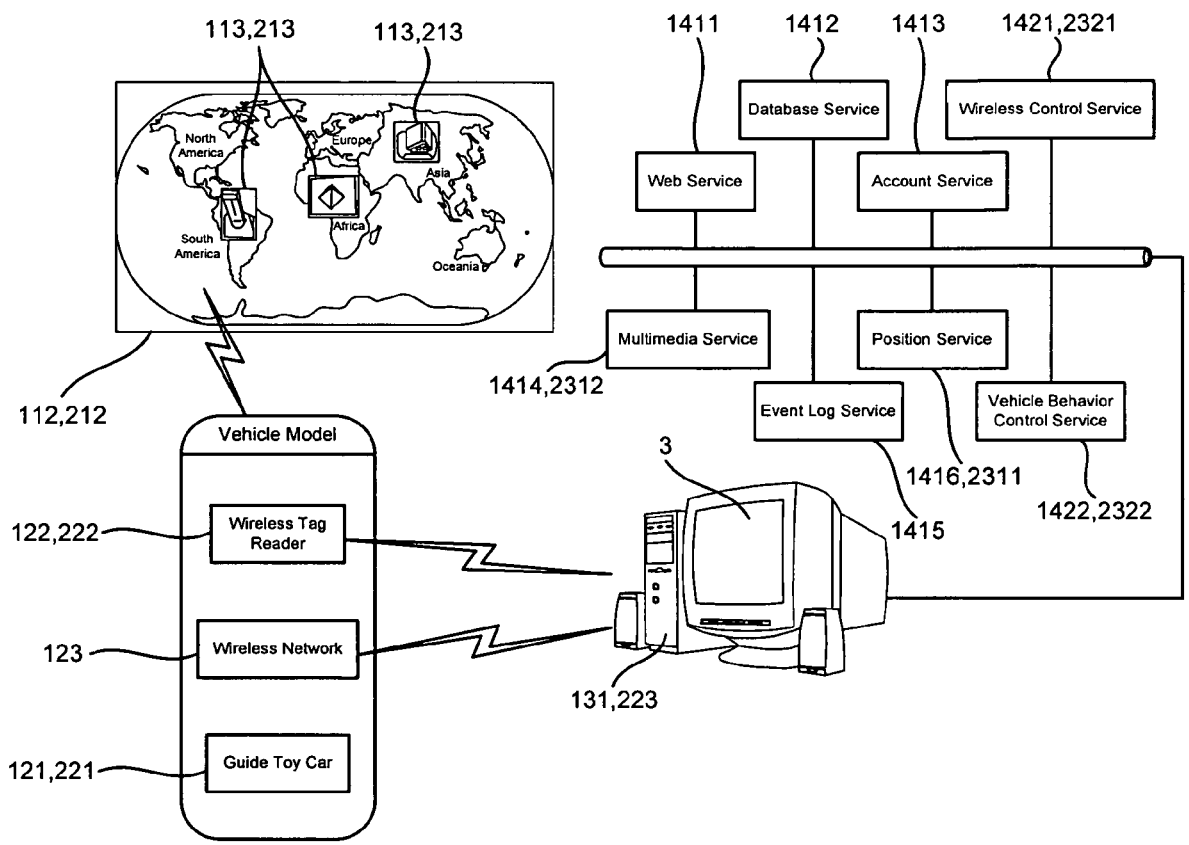
FIG. 1 is the view showing the state of use according to the present invention.
Figure 2:
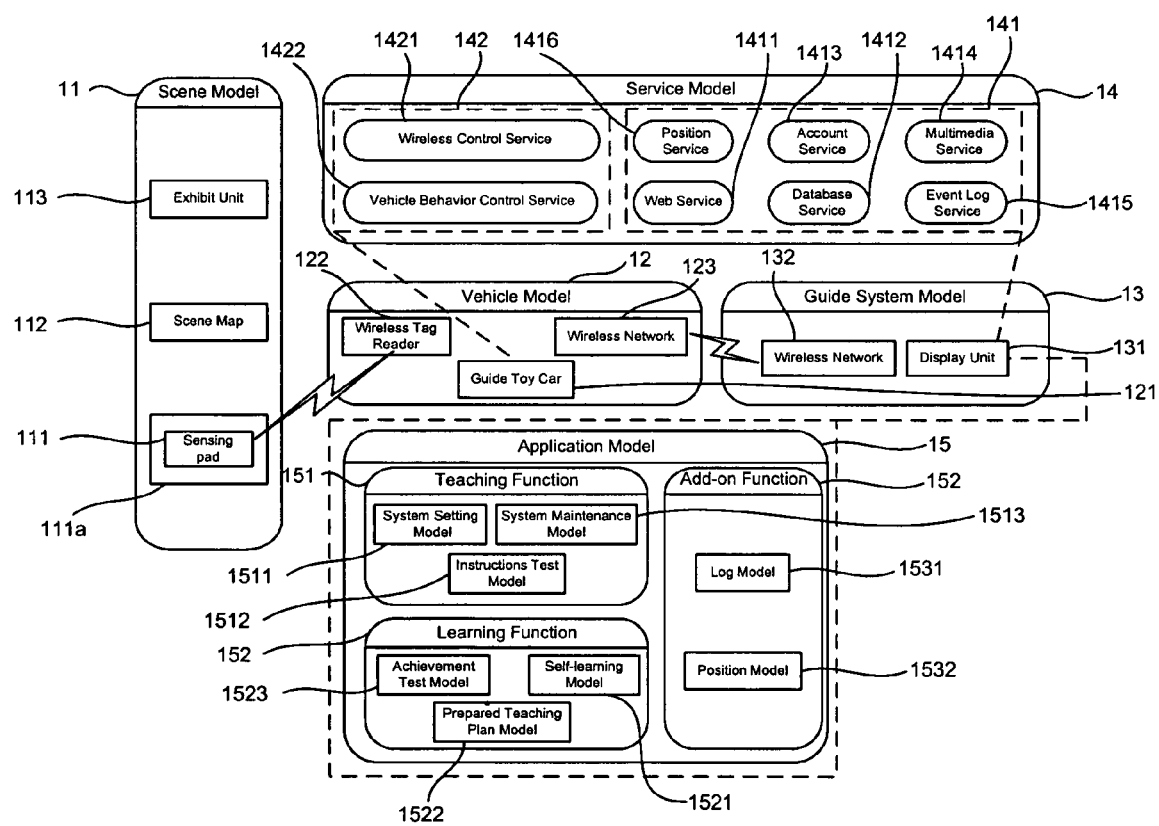
FIG. 2 is the structural views showing the first preferred embodiment.
Figure 3:
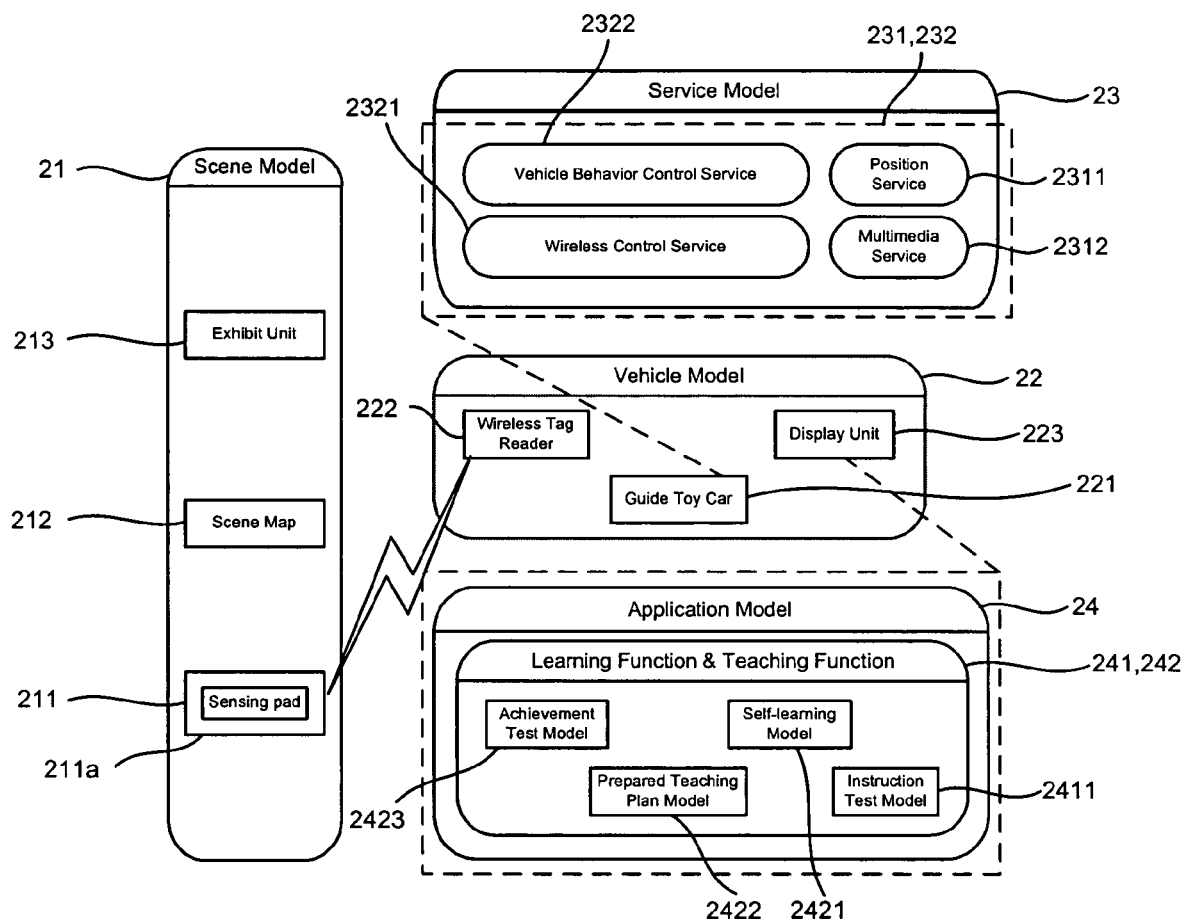
FIG. 3 is the structural view showing the second preferred embodiment.

Please refer to FIG. 1 to FIG. 3 which are a view showing a state of use according to the present invention and structural views showing a first preferred embodiment and a second preferred embodiment. As shown in the figures, the present invention is an automatic position-based guide toy vehicle apparatus. A first preferred embodiment 1 according to the present invention is a whole-system architecture, comprising a scene model 11, a vehicle model 12, a guidance system model 13, a service model 14 and an application model 15, where exhibition center services are integrated in a single platform for providing services during guidance without going to actual places; a vehicular guide toy vehicle with an auto-positioning function is controlled through a wireless network; and a sensing pad is used for positioning and route-finding.

The scene model 11 comprises a sensing pad 111 in a floor environment; a scene map 112 providing guidance materials; and at least one exhibit unit 113 for the guidance materials. The scene model 11 has a smart floor environment 111a built with the sensing pad 111, where and indoor or outdoor scenario is formed by filling the sensing pad 111 in the smart floor environment 111a.

The vehicle model 12 comprises a guide toy vehicle 121; a wireless reader 122 on the guide toy vehicle 121; and a first wireless network unit 123, where the wireless reader 122 is connected with a personal digital assistant (PDA) through a wireless interface.

The guidance system model 13, comprises a display unit 131 and a second wireless network unit 132, plays audio and video.

The service model 14 comprises a system service 141 and a mobile vehicle control service 142, where the system service 141 comprises a web service 1411, a database service 1412, an account service 1413, a multimedia service 1414, an event log service 1415 and a positioning service 1416; and the mobile vehicle control service 142 comprises a wireless control service 1421 and a vehicle behavior control service 1422.

The application model 15 comprises a teaching function 151, a learning function 152 and an add-on function 153, where the teaching function 151 comprises a system configuration model 1511, and instruction test model 1512 and a system maintenance model 1513; the learning function 152 comprises a self-learning model 1521, a prepared teaching plan model 1522 and an achievement test model 1523; and the add-on function 153 comprises a log model 1531 and a positioning model 1532, Thus, with the above structure, a novel automatic position-based guide toy vehicle apparatus is obtained.

On using the present invention the smart floor environment 111*a* is designed for positioning and route-choosing, where each positioning point or area is corresponding to a guidance material with related positioning data; the exhibit unit 113 is placed at a position on the scene map 113 related to an actual place. After a guidance scenario is decided, the guide toy vehicle 121 is controlled through the first and the second wireless networks 123, 132 to move on the scene map 112 during the guidance. The guide toy vehicle 121 uses position in g data provided by the smart floor environment 111*a* to obtain data of the sensing pad 11 read by the wireless reader 122. The data are sent to the database service 1412 of the system service 141 through the wireless networks 123, 132 to be analyzed and find a route. Then the through the wireless networks 123, 132 to a target exhibit. After the guide toy vehicle 121 is arrived at the positioning point or area of the target obtained by the guidance system model 13 according to a relationship found in a back-end management system to be displayed on the display unit 131.

The guidance system model 13 has a lot of options for guidance, including showing pictures and printed materials and playing audio and video (A/V) multi media. Regarding the system service 141, the present invention uses the web service 1411 to show guidance content on web, where information of the target exhibit is displayed through web browsing. An interactive learning and a prior learning for the guidance content can be set with the guidance system model 13. The database service 1412 provides account information, event data and information of the target exhibit, including pictures, multimedia data and documents. The account service 1413 connects to an account database to show or edit account data or authority. The multimedia service 1414 connects to a database of the target exhibit to show information of the target exhibit with multimedia for improving learning results. The event log service 1415 connects to an event database to record a guiding history of the guide toy vehicle 121. The positioning service 1416 prevents the guide toy vehicle 121 from hitting obstacle along the route; and the guide toy vehicle 121 can thus modify its route for approaching the target exhibit. Therein, the guide toy vehicle 121 uses the wire less control service 1421 of the mobile vehicle control service 142 to communicate with a back-end control console. Thus, the vehicle behavior control service 1422 changes motions of the guide toy vehicle 121 through positioning processes and operations, like stopping, forwarding, turning right and turning left.

In the other hand, as shown in FIG. 3, a second preferred embodiment 2 according to the present invention is a pocket-size architecture, comprising a scene model 21, a vehicle model 22, a service model 23 and an application model 24. Therein, the scene model 21 comprises a sensing pad 211, a scene map 212 and at least one exhibit unit 213. A smart floor environment 211*a* is built with the sensing pad 211 for positioning and guiding; and an indoor or outdoor scenario is formed by filling the sensing pad 211 in the smart floor environment 211*a*. The vehicle model 22 comprises a guide toy vehicle 221; a wireless reader 222 on the guide toy vehicle 221; and a display unit 223. The service model 23 comprises a system service 231 and a mobile vehicle control service 232. The system service 231 comprises a positioning service 2311 and a multimedia service 2312. The mobile vehicle control service 232 comprises a wireless control service 2321 and a vehicle behavior control service 2322. The application model 24 comprises a teaching function 241 and a learning function 242. The teaching function 241 comprises an instruction test model 2411. And, the learning function 242 comprises a self-learning model 2421, a prepared teaching plan model 2422 and an achievement test model 2423. Thus, with the above structure, a novel automatic position-based guide toy vehicle apparatus is obtained.

Figure 4:
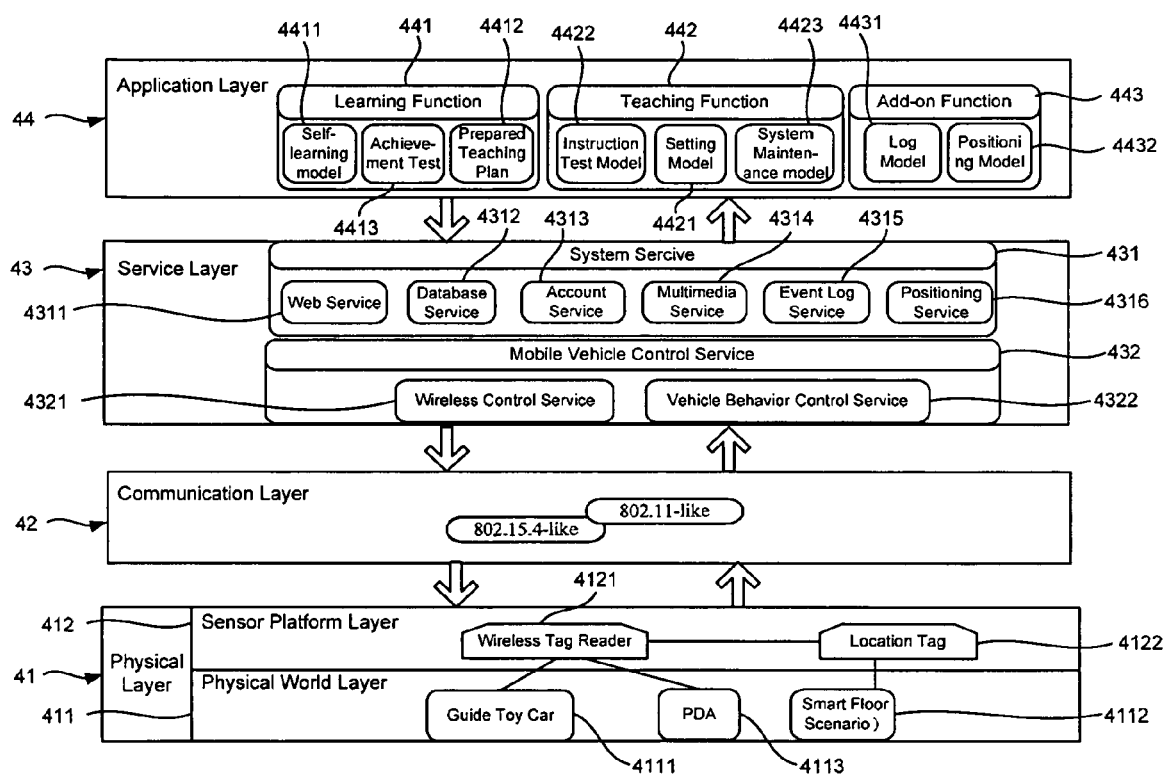
FIG. 4 is the view showing the protocol stack.

Please refer to FIG. 4, which is a view showing the protocol stack. As shown in the figure. The present invention hierarchically comprises a physical 42, a service layer 43 and an application layer 44.

The physical layer 41 has equipments used in an actual environment, comprising a physical world layer 411 and a sensor platform layer 412, where the physical world layer 411 uses equipments of a guide toy vehicle 4111, a smart floor scenario 4112 and a PDA 4113; and the sensor platform layer 412 uses equipments of a wireless tag reader 4121 and at least one location tag 4122. The guide toy vehicle 4111 carries the PDA 4113, where the wireless tag reader 4121 connects to the PDA 41113 through a communication interface for the guide toy vehicle 4111 to receive system control command through a wireless network Therein, the whole system has a smart floor environment, where the location tag 4122 is filled in an actual environment for recognition and positioning.

The communication layer 42 provides interfaces for the service layer 43 and the physical layer 41, including an IEEE 802.15-like protocol for a wireless sensing network and an IEEE 802.11-like protocol for a wireless network for transmitting the location information. Through the wireless network, the guide toy vehicle 4111 is controlled and the wireless tag reader 4121 is connected to a back-end computer. Therein, the 802.15-like protocol is used to control the guide toy vehicle 4111. After a route for a next stop is figured out for the guide toy vehicle 4111, a control command is sent through the wireless network to change the motion of the guide toy vehicle 4111, like stopping, forwarding, turning right and turning left; or is sent to test the motion of the guide toy vehicle 4111. The 802.11-like protocol is used to connect the wireless tag reader 4121 to a back-end computer. After the wireless tag reader 4121 reads information of the location tag 4122, the information is sent through the wireless network to obtain a location data of the location tag 4122 from a back-end database; or the wireless tag reader 4121 is tested for initializing, closing, reading or writing digital data of the location tag 4122.

The service layer 43 is used to provide specific functions for the application layer 44 and to transfer messages from the communication layer 42, comprising a system service 431 and a mobile vehicle control service 432, where the system service 431 comprises a web service 4311, a database service 4312, an account service 4313, a multimedia service 4314, an event log service 4315 and a positioning service 4316; and the mobile vehicle control service 432 comprises a wireless control service 4321 and a vehicle behavior control service 4322.

The application layer 44 provides functions for the whole system through the service layer 43, comprising a learning function 441, a teaching function 442 and an add-on function 443, where the learning function 441 comprises a self-learning model 4411, a prepared teaching plan model 4412 and an achievement test model 4413; the teaching function 442 comprises a system configuration model 4421, an instruction test model 4422 and a system maintenance model 4423; and the add-on function 443 comprises a log model 4431 and a positioning model 4432.

Figure 5:
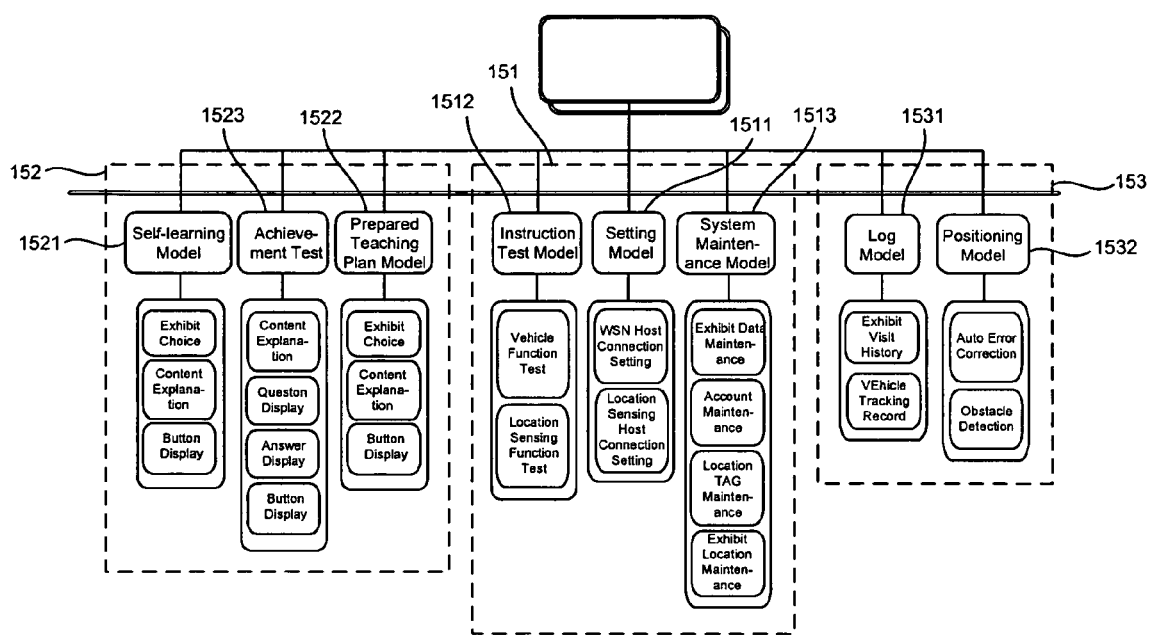
FIG. 5 is the view showing the levels of functions.
Figure 8:
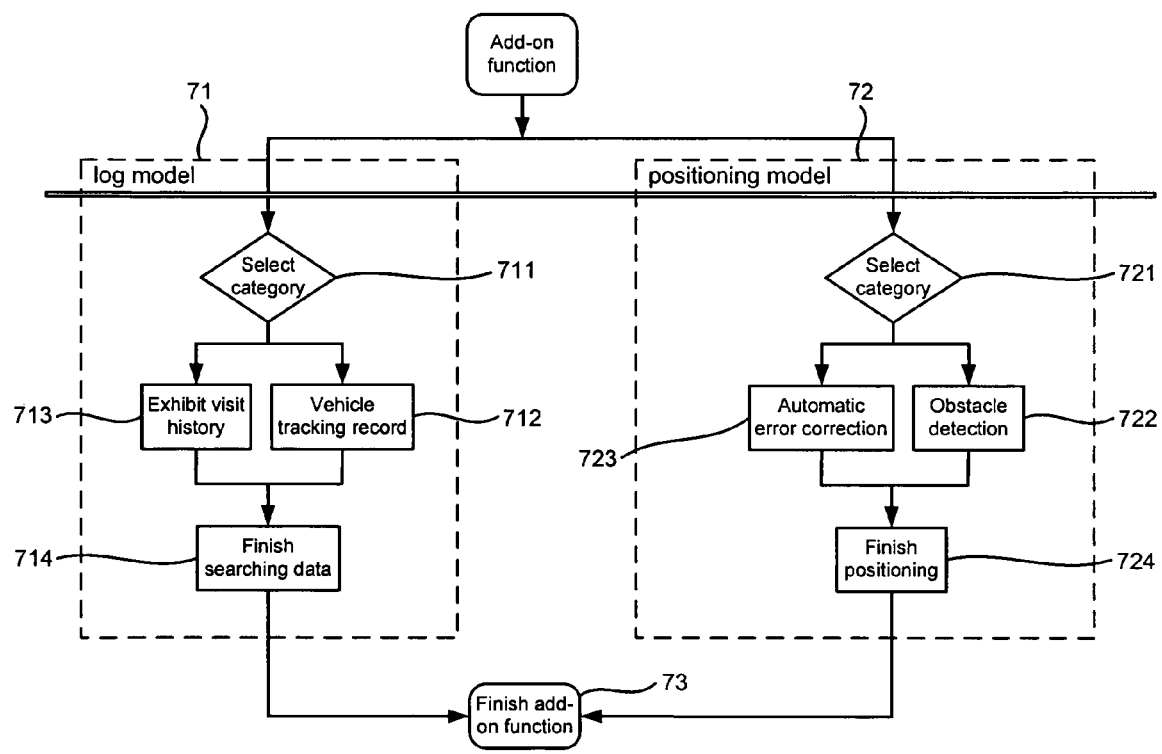
FIG. 8 is the flow view showing the add-on function.

Please refer to FIG. 5 and FIG. 8, which are a view showing levels of functions and flow views showing a learning function, a teaching function and an add-on function. As shown in the figures, an application model comprises a learning function 151, a teaching function 152 and an add-on function 153:

[Function 1] Learning Function

Figure 6:
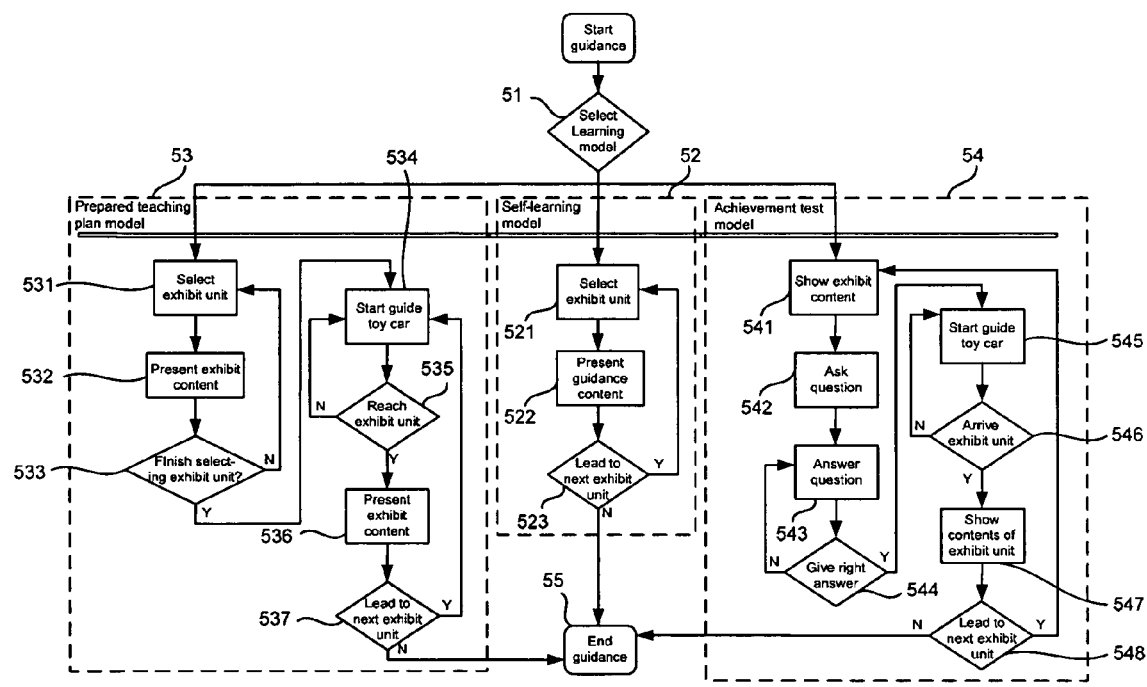
FIG. 6 is the flow view showing the learning function.

As shown in FIG. 6, the learning function 152 provides learning methods for user accounts, including a self-learning model 1521, a prepared teaching plan model 1522 and an achievement test model 1523, which is freely selected through the following steps:

(a1) Selecting learning model 51: A learning model is selected.

(b1) Selecting self-learning model 52: If the self-learning model 1521 is selected contents are shown in audios, videos, pictures or words vividly, where the self-learning model 1521 comprises an exhibit choice, a content explanation and a button display. The self-learning model 1521 is operated through the following steps:

(b11) Selecting exhibit unit 521: An exhibit unit is selected.
(b12) Presenting guidance content of selected exhibit unit 522: A guidance system model shows related information of the exhibit unit.
(b13) Deciding whether leading to next exhibit unit 523: A decision is made on whether leading to next exhibit unit or not. If yes, back to step (b11); if not, go to step (e1) to end guidance.

(c1) Selecting prepared teaching plan model 53: If the prepared teaching plan model 1522 is selected, different contents are displayed for different levels, where the prepared teaching plan model 1522 comprises an exhibit choice, a content explanation and a button display. The contents are selectable to obtain best learning for different levels of user accounts. If contents for a previous level are well learned a higher level can be selected. The prepared teaching plan model 1522 is operated through the following steps:

(c11) Selecting exhibit unit 531: An exhibit unit is selected.
(c12) Presenting exhibit content 532: The guidance system model shows related contents of the exhibit unit.
(c13) Examining whether finishing selecting exhibit unit 533: Whether selecting an exhibit unit is finished is examined. If yes, start the guidance; if not, go to step (c11) to select an exhibit unit again.
(c14) Starting guide toy vehicle 534: The guide toy vehicle is started to approach the exhibit unit.
(c15) Examining whether reaching selected exhibit unit 535: Whether the selected exhibit unit is reached is examined. If not, obstacle is cleared off for the guide toy car; and, then, go back to step (c14) to re-approach the exhibit unit.
(c16) Presenting selected exhibit content 536: The guidance system model shows related content of the exhibit unit.
(c17) Deciding whether leading to next exhibit unit 537: A decision is made on whether leading to next exhibit unit or not. If yes, back to step (c14) to start the guide toy vehicle for approaching the next exhibit unit; if not, go to step (e1) to end guidance.

(d1) Selecting achievement test model 54: If the achievement test model 1523 is selected, an interactive learning is obtained for learning quickly, confirming achievement and examining learning weakness, where the achievement test model 1523 comprises a content explanation, a question display, an answer display and a button display. Or, learning can be redone through the prepared teaching plan model 1522. Besides, the achievement test model 1523 also provides a reliable base for further improvement. The achievement test model 1523 is operated through the following steps:

(d11) Showing randomly-selected exhibit content 541: A randomly-selected exhibit unit is obtained and guidance contents of the exhibit unit are shown.
(d12) Asking question by guidance system module 542: The guidance system model asks a related question concerning the exhibit unit.
(d13) Answering question 543: The question is answered through buttons on the map.
(d14) Judging whether giving right answer 544: Whether the answer is right is judged. If wrong, go to step (d13) to answer the question again.
(d15) Starting guide toy vehicle 545: The guide toy vehicle is started to approach the exhibit unit; and the guidance system model shows a message of 'approaching . . . '.
(d16) Examining whether arriving exhibit unit 546: Whether the exhibit unit is arrived is examined. If not, obstacle is cleared off for the guide toy car; and, then, go back to step (d15) to approach the exhibit unit again.
(d17) Showing contents of exhibit unit 547: The guidance system model shows contents of the exhibit unit.
(d18) Deciding whether leading to next exhibit unit 548: A decision is made on whether leading to next exhibit unit or not. If yes, back to step (d11) to select another exhibit unit randomly again; if not, go to step (e1) to end guidance.

(e1) Ending guidance 55: The guidance ends.

[Function 2] Teaching Function

Figure 7:
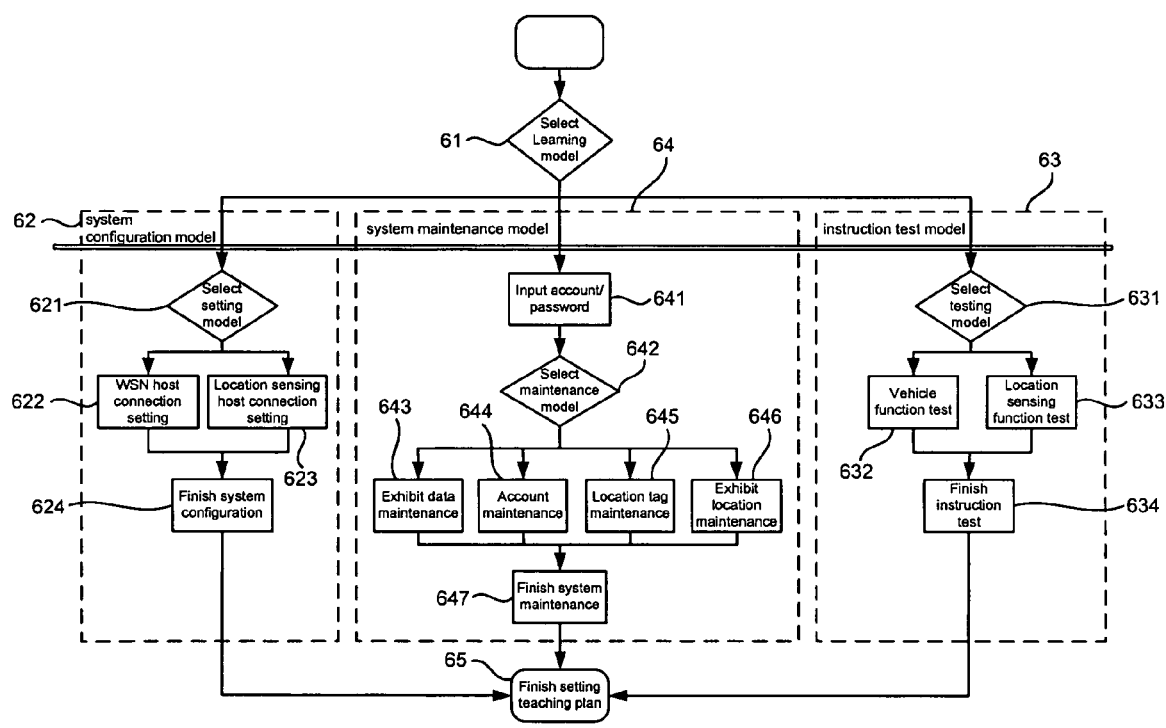
FIG. 7 is the flow view showing the teaching function.

As shown in FIG. 7, the teaching function 151 provides functions for administrator accounts, comprising a system configuration model 1511, an instruction test model 1512 and a system maintenance model 1513. The teaching function 151 is operated through the following steps:

(a2) Selecting learning model 61: A learning model 1511 is selected.

(b2) Selecting system configuration model 62: If the system configuration model 1511 is selected, a wireless network is configured, where the system con figuration model 1511 comprises a WSN host connection setting and a location sensing host connection setting. The system configuration model 1511 is operated through t he following steps:

(b21) Selecting setting model 621: A setting model is selected.
(b22) Selecting WSN host connection setting 622: When the WSN host connection setting is selected, a network connection of WSN is set through the WSN host connection setting for sending commands to the guide toy car. Thus the guide toy vehicle is able to receive controlling signals for reacting correspondingly. Then go to step (b24) to finish the system configuration.
(b23) Selecting location sensing host connection setting 623: When the location sensing host connection setting is selected, a wireless network connection is ready for sensing the location information and exhibit data is sent to the guidance system model by the guide toy car. Therein, data of a location tag detected through the guide toy vehicle are sent as wireless frequency signals through the location sensing host connection setting. The data of the location tag is sent to a back-end database service for recognition and positioning. Thus, present position of the guide toy vehicle is obtained through sending the exhibit data to the guidance system model.
(b24) Finishing system configuration b24: The system configuration is finished; and, then, go to step (e2) to finish setting a prepared teaching plan.

(c2) Selecting instruction test model 63: If the instruction test model 1512 is selected, a vehicle function test and a location sensing function test are done by the instruction test model. The instruction test model 1512 is operated through the following steps:
- (c21) Selecting testing model 631: A testing model is selected.
- (c22) Selecting vehicle function test 632: The guide toy vehicle is a self-moving vehicle having a 8051 single-chip controller and WSN components and the guide toy vehicle has two variable resistances on wheels. When the vehicle function test is selected, the guidance system model provides an interactive interface for instruction test of the guide toy car. Therein, related commands a resent through WSN to control the guide toy car; and thus to test a sport model of the guide toy car, functions of the wireless network and wellness of the 8051 single-chip controller. Then go to step (c24) to finish the instruction test.
- (c23) Selecting the location sensing function test 633: The tag sensing technology is used in the present invention, including a wireless tag reader and at least one location tag; When the location sensing function test is selected, functions concerning the location tag, like writing, reading modifying and auto-reading data, are tested by the location sensing function test. And, both of a wireless network interface provided by a PDA and an interface for connecting the wireless tag reader are tested too.
- (c24) Finishing instruction test 634: The instruction test is finished; and, then, go to step (e2) to finish setting the prepared teaching plan.

(d2) Selecting system maintenance model 64: The system maintenance model 1513 processes system maintenances, comprising an exhibit data maintenance, an account maintenance, a location tag maintenance and an exhibit location maintenance. The system maintenance model 1513 is operated through the following steps:
- (d21) Inputting account/password 641: An account/password is inputted for logging into system
- (d22) Selecting maintenance model 642: A maintenance model is selected for system maintenance.
- (d23) Selecting exhibit data maintenance 643: When the exhibit data maintenance is selected, exhibit data are maintained and enriched through a browser interface, including adding, deleting or editing guidance content, ID number, title audio content, video content, questions, graphics, pictures, etc. Then, go to (d27) to finish system configuration.
- (d24) Selecting account maintenance 644: When the account maintenance is selected, an account is verified for legal use of the system. A learning status of the account is traced and recorded for future learning. Then, go to (d27) to finish system configuration.
- (d25) Selecting location tag maintenance 645: When the location tag maintenance is selected, data of a location tag is verified and its usability is confirmed through writing and deleting data of the location tag. Then, go to (d27) to finish system configuration.
- (d26) Selecting exhibit location maintenance 646: When the exhibit location maintenance is selected, a location of an exhibit is changed into another one; or, area of the location is enlarged.
- (d27) Finishing system maintenance 647; The system maintenance is finished. Then, go to step (e2) to finish setting the prepared teaching plan.

(e2) Finishing setting teaching plan 65: The setting of the teaching plan is finished.

[Function 3] Add-on Function

As shown in FIG. 8, the add-on function 153 provides functions for administrator accounts and user accounts, comprising a log model 1531 and a positioning model 1532. The add-on function 153 is operated through the following steps:

(a3) Selecting log model 71: The log model 1531 records events for a learning history, comprising an exhibit visit history and a vehicle tracking record. The log model 1531 is operated through the following steps:
- (a31) Selecting category 711: A category is selected.
- (a32) Selecting exhibit visit history 712: When exhibit visit history is selected, a visit history is recorded for preventing exhibits visited at next tour and thus visiting new exhibit. Then, go to step (a34) to finish searching data.
- (a33) Selecting vehicle tracking record 713: When vehicle tracking record is selected, a learning history through the guide toy vehicle is obtained.
- (a34) Finishing searching data 714: Searching data is finished. Then go to step (c2) to finish the add-on function.

(b3) Selecting positioning model 72: The positioning model 1532 comprises an automatic error correction and an obstacle detection The positioning model 1532 is operated through the following steps:
- (b31) Selecting category 721: A category is selected
- (b32) Selecting obstacle detection 722: When the obstacle detection is selected, the guide toy vehicle is prevented from hitting obstacle along a route. Then, go to step (b34) to finish positioning
- (b33) Selecting automatic error correction 723: When the automatic error correction is selected, the route is amended for the guide toy vehicle to approach the target exhibit gradually.
- (b34) Finishing positioning 724: The positioning is finished.

(c3) Finishing add-on function 73: The add-on function is finished.

Figure 9:
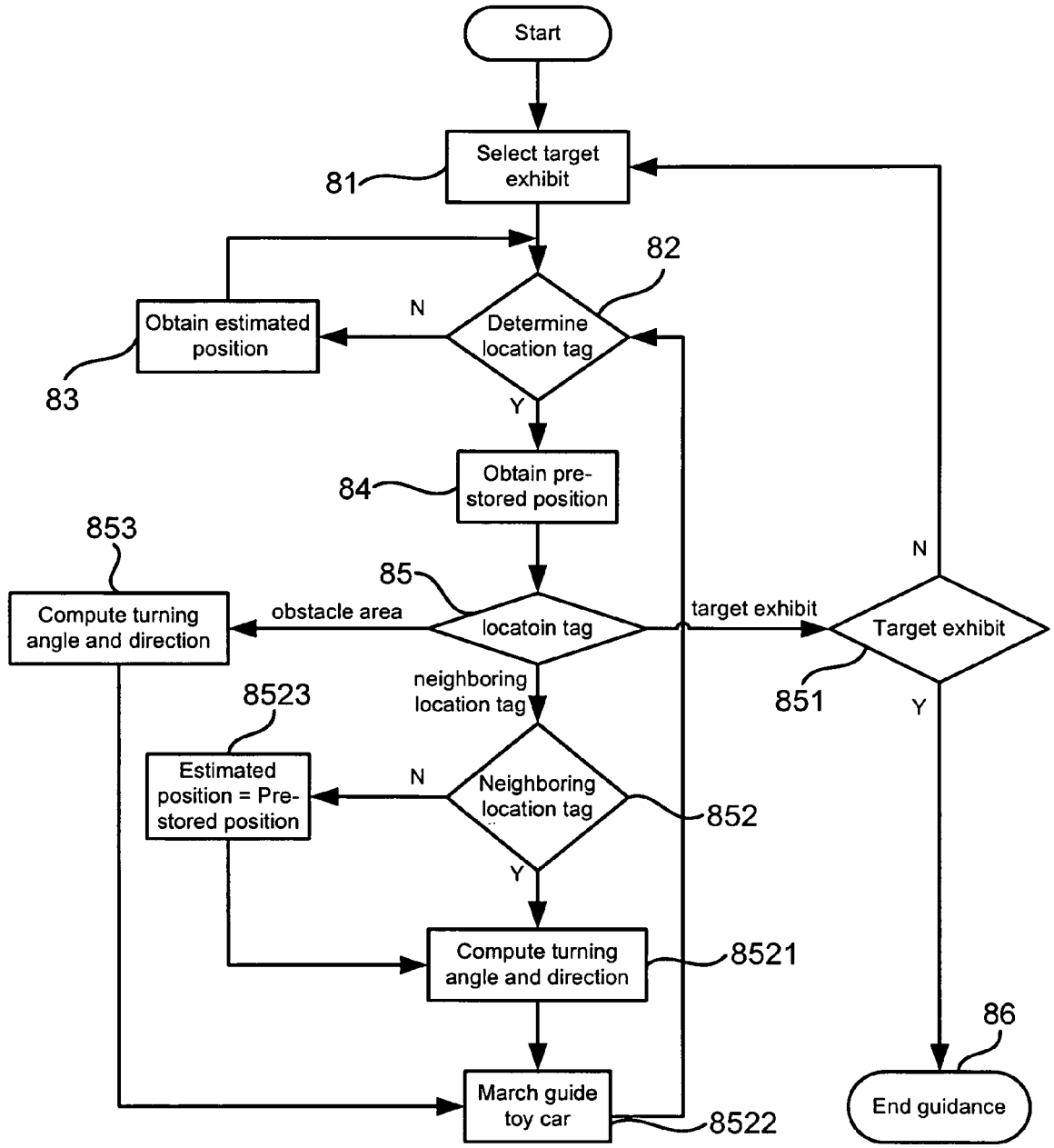
FIG. 9 is the flow view showing the positioning function.
Figure 10:
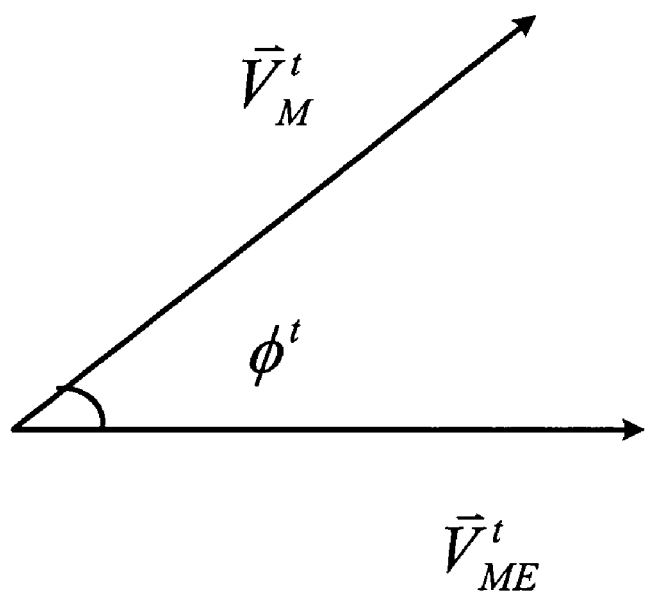
Figure 11:
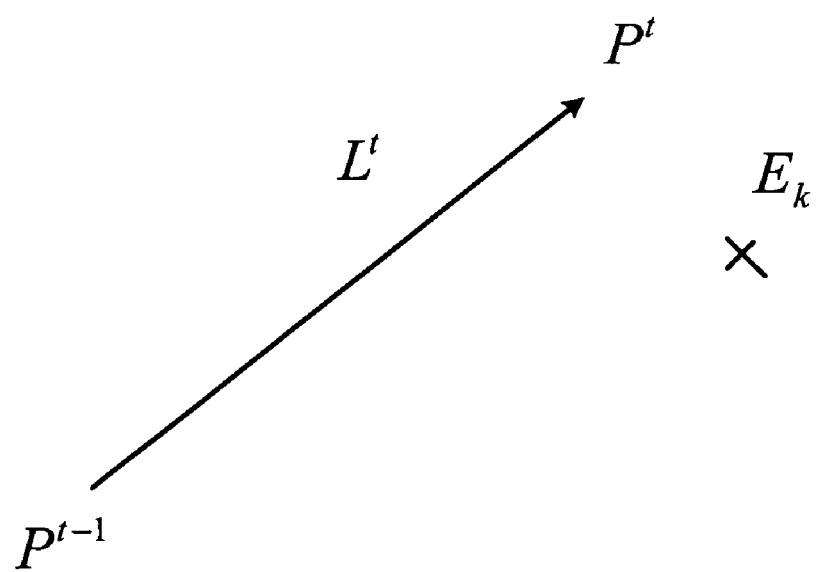
FIG. 11 is the view showing the direction determination.

Please refer to FIG. 9 to FIG. 11, which are a flow view showing a positioning function; a view showing two vectors with an angle in between; and a view showing a direction determination. As shown in the figures reactive location tags are used in a positioning model and a wireless tag reader is used for reading data, where each location tag has a number $R_i$; a target exhibit has a number $E_k$; location coordinates of the location tag and the target exhibit are $C_i$ and $C_k$ respectively; and obstacle corresponding to the target exhibit $E_k$ has a number $O_k$; and the above date are stored in a database. The positioning function is operated through the following steps:

(a4) Selecting target exhibit 81: A target exhibit $E_k$ is selected.

(b4) Determining location tag 82: The automatic error correction starts; and, after a unit of time, it is determined whether the location tag is read by the wireless tag reader or not when a guide toy vehicle M moves along the route If yes, go to step (d4) to obtain a pre-stored position (c4) Obtaining estimated position 83: If no location tag is read by the wireless tag reader, an azimuth angle $\theta^t$ and coordinates $P^t=(x^t,y^t)$ of a previous position of the guide toy vehicle M as well as a distance V of a last move are obtained to figure out coordinates $P^{t+1}=(x^{t+1},y^{t+1})$ of an estimated position. Therein, the coordinates $P^{t+1}=(x^{t+1},y^{t+1})$ of the estimated position are figured out with the distance V of the last move and the azimuth angle $\theta^t$ and coordinates $P^t=(x^t, y^t)$ of the previous position, whose formulas are $x^{t+1}=x^t+V\cos(\theta^t)$ and $y^{t+1}=y^t+V\sin(\theta^t)$ (d4)Obtaining pre-stored position 84: If a location tag $R_i$ is read by the wireless tag reader, a number of the location tag $R_i$ is sent to a back-end computer to obtain coordinates $P^{t+1}=(x^{t+1},y^{t+1})$ of a pre-stored position. Then, an azimuth angle $\theta^{t+1}$ is obtained with the coordinates $P^{t+1}=(x^{t+1},y^{t+1})$ of the pre-stored position through an inverse tangent function, whose formula is $$\theta^{t+1} = \tan^{-1}\frac{y^{t+1}}{x^{t+1}}.$$

(e4) Discriminating location tag 85: In the obstacle detection of the positioning model, data of the location tag $R_i$ read through the guide toy vehicle M are sent to a database in the back-end computer for discriminating through the following steps.

- (e41) Recognizing target exhibit 851: If the target exhibit $E_k$ is recognized with the location tag, a message of "arrived" is sent to the back-end computer. Data of the target exhibit $E_k$ are obtained through a database service and are displayed through a web service. Then, it is decided whether ending guidance or not. If yes, go to step (f4) to end guidance; if not, back to step (a4) to select another target exhibit again.
- (e42) Recognizing neighboring location tag 852: It is judged whether a neighboring location tag is read. According to the judgment, the following steps are processed:
  - (e421) Computing turning angle and direction 8521: As shown in FIG. 10 and FIG. 11, when a neighboring location tag is read, a vector $\overline{V}_M^t$ of a last position to the present position and a vector $\overline{V}_{ME}^t$ of the present position to the target exhibit are used to figure out a turning angle $\varphi^t$ of the guide toy vehicle along a continuous route. Therein, the turning angle $\varphi^t$ is obtained through an inverse cosine function, whose formula is $$\varphi^t = \cos^{-1}\frac{\overline{V}_M^t \cdot \overline{V}_{ME}^t}{|\overline{V}_M^t||\overline{V}_{ME}^t|}.$$

On deciding a turning direction, coordinates $C_k$ of the target exhibit $E_k$ is used for a substitution in a linear function $L^t$ decided by the guide toy vehicle M between the last position and the present position. After the substitution, if the linear function $L^t$ is greater than 0, the turning direction is right; if smaller, left, and, if equal, on the line.
  - (e422) Marching guide toy vehicle 8522: Control commands are sent to the guide toy vehicle M through a wireless network for approaching the target exhibit gradually. Then, go to step (b4) to read another location tag.
  - (e423) Taking pre-stored position as estimated position 8523: If non-neighboring location tag is recognized, the pre-stored position is taken as the estimated position with a formula of $S^0(P^{t+1})=S^1(P^{t+1})=C_i$; and, then, go to step (e421) to obtain a turning angle and a turning direction.
- (e43) Recognizing obstacle area 853: If an obstacle area is recognized, a turning angle $\varphi^t$ and a turning direction are obtained through step (e421); and, then, go to step (e422) to march the guide toy vehicle M. Therein, if the turning angle $\varphi^t$ is between 0° and 90°, the turning angle becomes 90° toward the target exhibit $E_k$; and, if between 90° and 180° the turning angle is $\varphi^t$ toward the target exhibit $E_k$.

(f4) Ending guidance 86: The guidance ends.

To sum up, the present invention is an automatic position-based guide toy vehicle apparatus, where a smart floor environment is provided to guide a guide toy vehicle for correct positioning; and a simple management system is provided for a better earning.

The preferred embodiments herein disclosed are not intended to unnecessarily limit the scope of the invention. Therefore, simple modifications or variations belonging to the equivalent of the scope of the claims and the instructions disclosed herein for a patent are all within the scope of the present invention.

What is claimed is:

1. An automatic position-based guide toy vehicle apparatus, comprising:
   a scene model, said scene model comprising a sensing pad, a scene map and a plurality of exhibit units, said sensing pad building a smart floor environment to provide positioning and guiding;
   a vehicle model, said vehicle model comprising a guide toy car, a wireless reader and a wireless network, said guide toy vehicle carrying said wireless reader;
   a guidance system model, said guidance system model comprising a display unit and a wireless network, said guidance system model playing audio, video and pictures;
   a service model, said service model comprising a system service and a mobile vehicle control service; and
   an application model, said application model comprising a teaching function, a learning function and an add-on function.

2. The apparatus according to claim 1, wherein said system service comprises a positioning service, an account service, a multimedia service, a web service, a database service and an event log service.

3. The apparatus according to claim 1, wherein said mobile vehicle control service comprises a wireless control service and a vehicle behavior control service.

4. The apparatus according to claim 1, wherein said teaching function comprises a system configuration model, an instruction test model and a system maintenance model.

5. The apparatus according to claim 1, wherein said learning function comprises an achievement test model a prepared teaching plan model, and a self-learning model.

6. The apparatus according to claim 1, wherein said add-on function comprises a log model and a positioning model.

7. The apparatus according to claim 6, wherein said automatic error correction obtains an azimuth angle $\theta^{t+1}$ of an estimated position and coordinates $P^{t+1}=(x^{t+1},y^{t+1})$ of said estimated position through steps of:
   (a) obtaining said azimuth angle $\theta^{t+1}$ of said estimated position by adding an azimuth angle $\theta^t$ of a position with a turning angle $\varphi^t$ of a guide toy car, whose formula is $\theta^{t+1}=\theta^t+\varphi^t$; and
   b) obtaining coordinates $P^{t+1}=(x^{t+1},y^{t+1})$ of said estimated position through trigonometric functions with a distance V of a last move and said azimuth angle $\theta^t$ and coordinates $P^t=(x^t,y^t)$ of said position, whose formulas are $x^{t+1}=x^t+V\cos(\theta^t)$ and $y^{t+1}=y^t+V\sin(\theta^t)$.

8. The apparatus according to claim 7, wherein said estimated position is taken as present position on reading no location tag in said automatic error correction.

9. The apparatus according to claim 7,
wherein coordinates of a pre-stored position of a location tag are taken as coordinates of present position on reading said location tag in said automatic error correction.

10. The apparatus according to claim 1,
wherein said apparatus physically comprises a physical layer, a communication layer, a service layer and an application layer.

11. The apparatus according to claim 10,
wherein said physical layer comprises a physical world layer and a sensor platform layer.

12. The apparatus according to claim 1,
wherein said smart floor environment has a scenario filled with said sensing pad.

13. An automatic position-based guide toy vehicle apparatus, comprising:
- a scene model, said scene model comprising a sensing pad, a scene map and a plurality of exhibit units, said sensing pad building a smart floor environment to provide positioning and guiding;
- a vehicle model, said vehicle model comprising a guide toy car, a wireless reader and a display unit, said guide toy vehicle carrying said wireless reader;
- a service model, said service model comprising a system service and a mobile vehicle control service; and
- an application model, said application model comprising a teaching function and a learning function.

14. The apparatus according to claim 13,
wherein said system service comprises a positioning service and a multi media service.

15. The apparatus according to claim 13,
wherein said mobile vehicle control service comprises a wireless control service and a vehicle behavior control service.

16. The apparatus according to claim 13,
wherein said teaching function comprises an instruction test model.

17. The apparatus according to claim 13,
wherein said learning function comprises an achievement test model a prepared teaching plan model and a self-learning model.

18. The apparatus according to claim 13,
wherein said apparatus physically comprises a physical layer, a communication layer, a service layer and an application layer.

19. The apparatus according to claim 18,
wherein said physical layer comprises a physical world layer and a sensor platform layer.

20. The apparatus according to claim 13,
wherein said smart floor environment has a scenario filled with said sensing pad.

* * * * *